US012658520B2

(12) United States Patent
Huang et al.

(10) Patent No.: US 12,658,520 B2
(45) Date of Patent: *Jun. 16, 2026

(54) ENERGY STORAGE POWER SUPPLY

(71) Applicant: SHENZHEN HELLO TECH ENERGY CO., LTD, Shenzhen (CN)

(72) Inventors: Shuisheng Huang, Shenzhen (CN); Zhongwei Sun, Shenzhen (CN); Gaosong Shen, Shenzhen (CN); Yongjun Chen, Shenzhen (CN)

(73) Assignee: SHENZHEN HELLO TECH ENERGY CO., LTD, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/358,465

(22) Filed: Oct. 15, 2025

(65) Prior Publication Data

US 2026/0038949 A1     Feb. 5, 2026

Related U.S. Application Data

(63) Continuation of application No. 18/736,557, filed on Jun. 7, 2024.

(30) Foreign Application Priority Data

Jun. 20, 2023  (CN) ......................... 202310742690.7
Jun. 20, 2023  (CN) ......................... 202321601200.3

(51) Int. Cl.
  *H01M 50/264*      (2021.01)
  *H01M 50/213*      (2021.01)
        (Continued)

(52) U.S. Cl.
  CPC ....... *H01M 50/264* (2021.01); *H01M 50/213* (2021.01); *H01M 50/291* (2021.01); *H01M 50/507* (2021.01)

(58) Field of Classification Search
  CPC ............. H01M 50/264; H01M 50/213; H01M 50/291; H01M 50/507
  See application file for complete search history.

(56) References Cited

U.S. PATENT DOCUMENTS 4,319,178 A      3/1982  Sugalski
5,578,392 A *  11/1996  Kawamura ......... H01M 50/213
                                                                        429/178
                    (Continued)

FOREIGN PATENT DOCUMENTS

CN        206976425 U     2/2018
CN        217740732 U    11/2022
                    (Continued)

OTHER PUBLICATIONS

International Search Report dated Jun. 13, 2024 in International Application No. PCT/CN2024/083874. English translation attached.
                    (Continued)

*Primary Examiner* — Michael L Dignan

(57)                    ABSTRACT

Provided is an energy storage power supply including a housing having an accommodation cavity, a plurality of cells, a second support disposed in the accommodating cavity, a busbar assembly configured to electrically connect the cells, and a port provided on the housing and configured to connect the energy storage power supply to an electrical device or a charging device. The accommodation cavity is provided with a first support at an inner wall of the accommodation cavity. The first support is provided with a plurality of first fixing members. The cells correspond to the first fixing members in one-to-one correspondence, and first ends of the cells are accommodated in the first fixing members, respectively. The second support is provided with a plurality of second fixing members corresponding to the plurality of cells in one-to-one correspondence, and second
                    (Continued)

ends of the cells are accommodated in the second fixing members, respectively.

19 Claims, 6 Drawing Sheets

(51) Int. Cl.
H01M 50/291 (2021.01)
H01M 50/507 (2021.01)

(56) References Cited

U.S. PATENT DOCUMENTS

| | | | | |
|---|---|---|---|---|
| 9,917,457 | B2 * | 3/2018 | Wenger ................. | H02J 7/0044 |
| 11,145,932 | B2 * | 10/2021 | Didier ................. | H01M 50/213 |
| 2014/0154541 | A1 | 6/2014 | Asakura et al. | |
| 2015/0179995 | A1 * | 6/2015 | Nakamura ............ | H01M 50/24 |
| | | | | 429/158 |
| 2017/0256826 | A1 | 9/2017 | Hong et al. | |
| 2020/0176736 | A1 * | 6/2020 | Taga ..................... | H01M 50/24 |
| 2022/0407140 | A1 | 12/2022 | Hemetzberger et al. | |
| 2023/0378561 | A1 * | 11/2023 | Totman ............... | H01M 50/271 |

FOREIGN PATENT DOCUMENTS

| | | | |
|---|---|---|---|
| CN | 218351606 | U | 1/2023 |
| CN | 116018713 | A | 5/2023 |
| CN | 116826292 | A | 9/2023 |
| CN | 220400809 | U | 1/2024 |
| CN | 118970347 | A | 11/2024 |
| CN | 118970348 | A | 11/2024 |
| EP | 2104121 | A1 | 9/2009 |
| JP | 2006100147 | A | 4/2006 |
| JP | 20075288 | A | 1/2007 |
| JP | 2013110080 | A | 6/2013 |
| JP | 20186275 | A | 1/2018 |
| JP | 2021177499 | A | 11/2021 |

OTHER PUBLICATIONS

Written Opinion of the International Search Authority dated Jun. 13, 2024 in International Application No. PCT/CN2024/083874. English translation attached.
Notice of Reasons for Refusal dated Aug. 6, 2024 received in corresponding patent family application No. JP2024-083089. English translation attached.
Notice of Reasons for Refusal dated Jan. 7, 2025 received in corresponding patent family application No. JP2024-083089. English translation attached.
Decision to Grant a Patent dated Apr. 22, 2025 received in corresponding patent family application No. JP2024-083089. English translation attached.
The Grant Notice from corresponding Chinese Application No. 202321601200.3, dated Dec. 18, 2023. English translation attached.
First Office Action dated Jan. 17, 2025 received in corresponding patent family application No. CN202310742690.7. English translation attached.
Second Office Action dated Aug. 8, 2025 received in corresponding patent family application No. CN202310742690.7. English translation attached.
Non-Final Rejection dated Aug. 22, 2025 received in corresponding patent family application U.S. Appl. No. 18/736,557.
Zhang, Qiang. "Military mobile power station technology" National Defense Industry Press, Oct. 31, 2016 (Oct. 31, 2016). pp. 158.
Notice of Reasons for Refusal dated Oct. 21, 2025 received in corresponding patent family application No. JP2025063399. English translation attached.
Notice of Allowance dated Nov. 25, 2025 received in corresponding patent family application U.S. Appl. No. 18/736,557.
Rejection Decision dated Oct. 31, 2025 received in corresponding patent family application No. CN202310742690.7. English translation attached.
Extended European Search Report dated May 6, 2026 received in corresponding patent family European Application No. EP24824958.3.

* cited by examiner

ENERGY STORAGE POWER SUPPLY

CROSS-REFERENCE TO RELATED APPLICATION

This application is a continuation of U.S. application Ser. No. 18/736,557, filed on Jun. 7, 2024, which claims priority to Chinese Patent Application No. 202310742690.7, filed on Jun. 20, 2023, and Chinese Patent Application No. 202321601200.3, filed on Jun. 20, 2023. The disclosures of the aforementioned applications are hereby incorporated by reference in their entireties.

FIELD

The present disclosure relates to the field of energy storage technologies, and more particular, to an energy storage power supply.

BACKGROUND

In the related art, parts such as a cell, a cell support, a busbar, a collection plate, and a screw are assembled into a battery module, and then the battery module is mounted into a product housing and fixed by screws, to assemble into an energy storage power supply. However, in an existing solution, the number and types of structural members are large, with many assembly processes and a high cost. In order to reserve a mounting space, a space utilization rate of the product is low, and a size of the whole machine product is large.

SUMMARY

In a first aspect, the present disclosure provides an energy storage power supply including a housing having an accommodation cavity defined therein, a plurality of cells, a second support disposed in the accommodating cavity, a busbar assembly configured to electrically connect the plurality of cells, and a port provided on the housing and configured to connect the energy storage power supply to an electrical device or a charging device. The accommodation cavity is provided with a first support at an inner wall of the accommodation cavity. The first support is provided with a plurality of first fixing members. The plurality of cells correspond to the plurality of first fixing members in one-to-one correspondence, and first ends of the plurality of cells are accommodated in the plurality of first fixing members, respectively. The second support is provided with a plurality of second fixing members corresponding to the plurality of cells in one-to-one correspondence, and second ends of the plurality of cells are accommodated in the plurality of second fixing members, respectively.

In a second aspect, the present disclosure provides an energy storage power supply including a housing having an accommodation cavity defined therein, a plurality of cells, a second support disposed in the accommodating cavity, a busbar assembly configured to electrically connect the plurality of cells, and a panel disposed on the housing and configured to display an electric quantity of the energy storage power supply. The accommodation cavity is provided with a first support at an inner wall of the accommodation cavity. The first support is provided with a plurality of first fixing members. The plurality of cells correspond to the plurality of first fixing members in one-to-one correspondence, and first ends of the plurality of cells being accommodated in the plurality of first fixing members, respectively. The second support is provided with a plurality of second fixing members corresponding to the plurality of cells in one-to-one correspondence, and second ends of the plurality of cells are accommodated in the plurality of second fixing members, respectively.

Additional aspects and advantages of the present disclosure will be provided in part in the following description, or will become apparent in part from the following description, or can be learned from practicing of the present disclosure.

BRIEF DESCRIPTION OF THE DRAWINGS

The above and/or additional aspects and advantages of the present disclosure will become more apparent and more understandable from the following description of implementations taken in conjunction with the accompanying drawings, in which.

Figure 1:
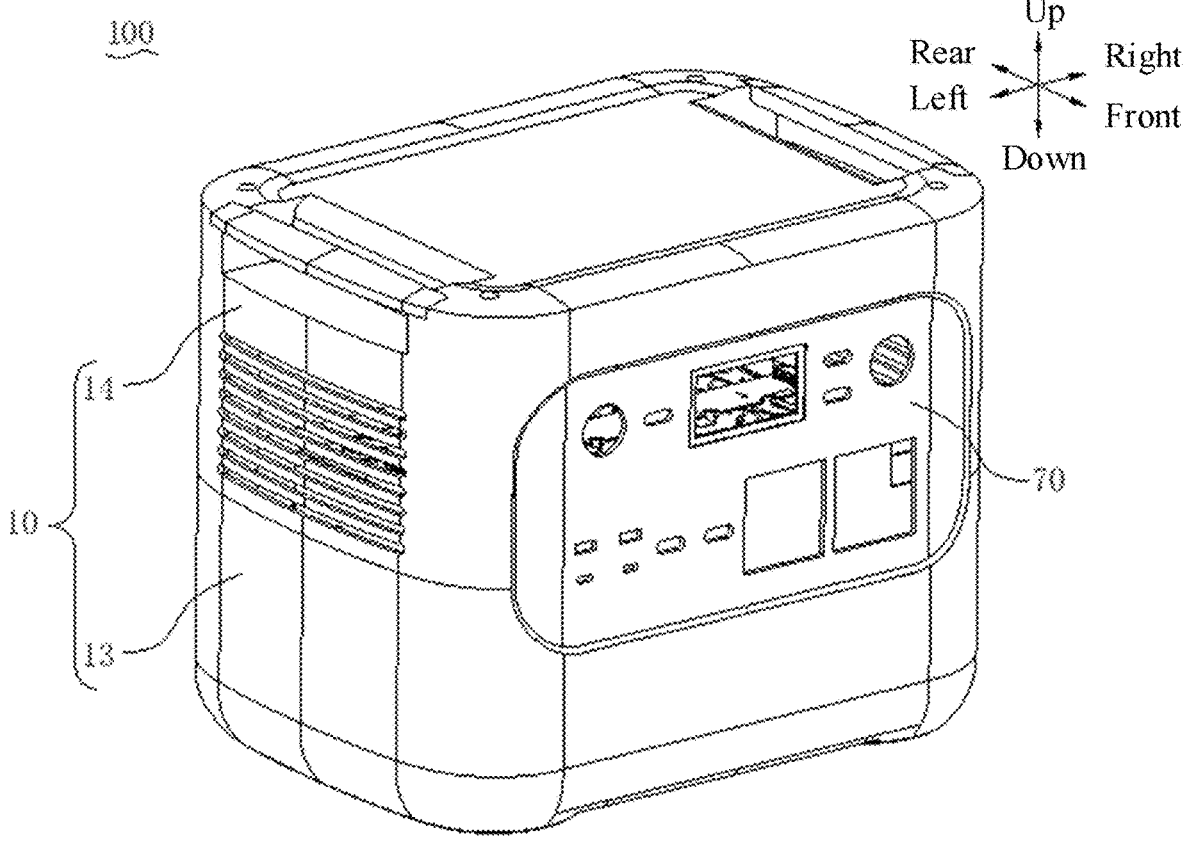
FIG. 1 is a schematic structural view of an energy storage power supply according to an implementation of the present disclosure.

Reference Signs of main components:

energy storage power supply—100, housing—10, accommodation cavity—11, first support—111, first fixing member—1111, first through hole—1112, surrounding wall—1113, accommodation groove—1114, support post—1115, second support—112, second through hole—1121, inner wall—113, outer side wall—12, receiving groove—121, first housing—13, second housing—14, cell—20, body—21, first pole—22, second pole—23, busbar assembly—30, first busbar—31, second busbar—32, collection assembly—40, first collection plate—41, second collection plate—42, cover plate—50, sealing ring—60, panel—70.

DETAILED DESCRIPTION

Implementations of the present disclosure will be described in detail below with reference to examples thereof as illustrated in the accompanying drawings, throughout which same or similar elements, or elements having same or similar functions, are denoted by same or similar reference numerals. The implementations described below with reference to the drawings are illustrative only, and are intended to explain, rather than limiting, the present disclosure.

Various implementations or examples for implementing different structures of the present disclosure are provided below. In order to simplify the description of the present disclosure, components and arrangements of specific examples are described herein. These specific examples are merely for the purpose of illustration, rather than limiting the present disclosure. Further, the same reference numerals and/or reference letters may appear in different examples of the present disclosure for the purpose of simplicity and clarity, instead of indicating a relationship between different implementations and/or the discussed arrangements. In addition, the present disclosure provides examples of various specific processes and materials. However, applications of other processes and/or the use of other materials are conceivable for those of ordinary skill in the art.

In addition, the terms "first" and "second" are only used for descriptive purposes, and cannot be understood as indicating or implying relative importance or implicitly indicating the number of indicated technical features. Therefore, the features associated with "first" and "second" may explicitly or implicitly include at least one of the features. In the description of the present disclosure, "a plurality of" means at least two, such as two, three, etc., unless otherwise specifically defined.

In the description of this specification, descriptions with reference to the terms "an implementation", "some implementations", "illustrative implementations", "examples", "specific examples", or "some examples" etc., mean that specific features, structure, materials or characteristics described in conjunction with the implementation or example are included in at least one implementation or example of the present disclosure. In this specification, the schematic representations of the above terms do not necessarily refer to the same implementation or example. Moreover, the described specific features, structures, materials or characteristics may be combined in any one or more implementations or examples in a suitable manner.

In the description of the present disclosure, technical terms such as "center", "longitudinal", "lateral", "length", "width", "thickness", "over", "below", "front", "back", "left", "right", "vertical", "horizontal", "top", "bottom", "in", "out", "clockwise", and "anti-clockwise" refer to the directions and location relations which are the directions and location relations shown in the drawings, and for describing the present disclosure and for describing in simple, and which are not intended to indicate or imply that the device or the elements are disposed to locate at the specific directions or are structured and performed in the specific directions, which could not to be understood to the limitation of the present disclosure.

In the present disclosure, unless expressly stipulated and defined otherwise, the first feature "on" or "under" the second feature may include that the first feature is in direct contact with the second feature, or further include that the first and second features are in indirect contact through another feature between the first and second features. Moreover, the first feature "above" the second feature may mean that the first feature is directly above or obliquely above the second feature, or simply mean that the level of the first feature is higher than that of the second feature. The first feature "below" the second feature may mean that the first feature is directly below or obliquely below the second feature, or simply mean that the level of the first feature is smaller than that of the second feature.

In the present disclosure, it should be noted that, unless otherwise clearly specified and limited, terms such as "install", "connect", "couple", and the like should be understood in a broad sense. For example, it may be a fixed connection or a detachable connection or connection as one piece; a mechanical connection or an electrical connection; a direct connection or an indirect connection through an intermediate; internal communication of two components or the interaction relationship between two components. For those of ordinary skill in the art, the specific meaning of the above terms in the present disclosure should be understood according to specific circumstances.

In a first aspect, the present disclosure provides an energy storage power supply including a housing having an accommodation cavity defined therein, a plurality of cells, a second support disposed in the accommodating cavity, a busbar assembly configured to electrically connect the plurality of cells, and a port provided on the housing and configured to connect the energy storage power supply to an electrical device or a charging device. The accommodation cavity is provided with a first support at an inner wall of the accommodation cavity. The first support is provided with a plurality of first fixing members. The plurality of cells correspond to the plurality of first fixing members in one-to-one correspondence, and first ends of the plurality of cells are accommodated in the plurality of first fixing members, respectively. The second support is provided with a plurality of second fixing members corresponding to the plurality of cells in one-to-one correspondence, and second ends of the plurality of cells are accommodated in the plurality of second fixing members, respectively.

In an embodiment of the energy storage power supply according to the first aspect, each of the plurality of cells is a cylinder cell, and each of the plurality of first fixing members comprises a circular groove matching a corresponding cylindrical cell.

In an embodiment of the energy storage power supply according to the first aspect, each of the plurality of cells is a square cell, and each of the plurality of first fixing members comprises a rectangular groove matching a corresponding square cell.

In an embodiment of the energy storage power supply according to the first aspect, the first support and the housing are integrally formed.

In an embodiment of the energy storage power supply according to the first aspect, the first support and the housing are made of plastic.

In an embodiment of the energy storage power supply according to the first aspect, the housing includes a first housing and a second housing, the first housing and the second housing being detachably connected to each other and enclosing the accommodation cavity, and the first support being disposed on the first housing or the second housing.

In an embodiment of the energy storage power supply according to the first aspect, the energy storage power supply further includes a panel disposed on the housing and configured to display an electric quantity of the energy storage power supply.

In an embodiment of the energy storage power supply according to the first aspect, the port is disposed on the panel.

In an embodiment of the energy storage power supply according to the first aspect, the first support includes a plurality of support posts extending to the second support in a height direction of the energy storage power supply and fixedly connected to the second support.

In an embodiment of the energy storage power supply according to the first aspect, each of the plurality of support posts has a threaded hole, the second support including a threaded member screwed into the threaded hole.

In an embodiment of the energy storage power supply according to the first aspect, the plurality of support posts and the first support are integrally formed.

In an embodiment of the energy storage power supply according to the first aspect, each of the plurality of second fixing members has a second through hole exposing an electrode disposed at the second end of a corresponding cell.

In an embodiment of the energy storage power supply according to the first aspect, each of the plurality of cells is a cylinder cell, and each of the plurality of second fixing members includes a circular groove, the second through hole being defined at a bottom wall of the circular groove.

In an embodiment of the energy storage power supply according to the first aspect, each of the plurality of first fixing members has a first through hole exposing an electrode disposed at the first end of a corresponding cell.

In an embodiment of the energy storage power supply according to the first aspect, a diameter of the first through hole is smaller than or equal to a diameter of the first fixing member.

In an embodiment of the energy storage power supply according to the first aspect, the busbar assembly includes a first busbar connecting electrodes disposed at the first ends of the plurality of cells and a second busbar connecting electrodes disposed at the second ends of the plurality of cells.

In an embodiment of the energy storage power supply according to the first aspect, the housing has a receiving groove defined at an outer wall of the housing corresponding to the first support, the first busbar being accommodated in the receiving groove and connecting the electrodes disposed at the first ends of the plurality of cells through the first through holes of the plurality of first fixing members.

In an embodiment of the energy storage power supply according to the first aspect, the energy storage power supply further includes a cover plate accommodated in the receiving groove and covering the receiving groove.

In a second aspect, the present disclosure provides an energy storage power supply including a housing having an accommodation cavity defined therein, a plurality of cells, a second support disposed in the accommodating cavity, a busbar assembly configured to electrically connect the plurality of cells, and a panel disposed on the housing and configured to display an electric quantity of the energy storage power supply. The accommodation cavity is provided with a first support at an inner wall of the accommodation cavity. The first support is provided with a plurality of first fixing members. The plurality of cells correspond to the plurality of first fixing members in one-to-one correspondence, and first ends of the plurality of cells being accommodated in the plurality of first fixing members, respectively. The second support is provided with a plurality of second fixing members corresponding to the plurality of cells in one-to-one correspondence, and second ends of the plurality of cells are accommodated in the plurality of second fixing members, respectively.

In an embodiment of the energy storage power supply according to the second aspect, the energy storage power supply further includes a port disposed on the panel and configured to connect the energy storage power supply to an electrical device or a charging device.

In an embodiment of the energy storage power supply according to the second aspect, each of the plurality of cells is a cylinder cell, and each of the plurality of first fixing members comprises a circular groove matching a corresponding cylindrical cell.

In an embodiment of the energy storage power supply according to the second aspect, each of the plurality of cells is a square cell, and each of the plurality of first fixing members comprises a rectangular groove matching a corresponding square cell.

In an embodiment of the energy storage power supply according to the second aspect, the first support and the housing are integrally formed.

In an embodiment of the energy storage power supply according to the second aspect, the first support and the housing are made of plastic.

In an embodiment of the energy storage power supply according to the second aspect, the housing includes a first housing and a second housing, the first housing and the second housing being detachably connected to each other and enclosing the accommodation cavity, and the first support being disposed on the first housing or the second housing.

In an embodiment of the energy storage power supply according to the second aspect, the first support includes a plurality of support posts extending to the second support in a height direction of the energy storage power supply and fixedly connected to the second support.

In an embodiment of the energy storage power supply according to the second aspect, each of the plurality of support posts has a threaded hole, the second support including a threaded member screwed into the threaded hole.

In an embodiment of the energy storage power supply according to the second aspect, the plurality of support posts and the first support are integrally formed.

In an embodiment of the energy storage power supply according to the second aspect, each of the plurality of second fixing members has a second through hole exposing an electrode disposed at the second end of a corresponding cell.

In an embodiment of the energy storage power supply according to the second aspect, each of the plurality of cells is a cylinder cell, and each of the plurality of second fixing members includes a circular groove, the second through hole being defined at a bottom wall of the circular groove.

In an embodiment of the energy storage power supply according to the second aspect, each of the plurality of first fixing members has a first through hole exposing an electrode disposed at the first end of a corresponding cell.

In an embodiment of the energy storage power supply according to the second aspect, a diameter of the first through hole is smaller than or equal to a diameter of the first fixing member.

In an embodiment of the energy storage power supply according to the second aspect, the busbar assembly includes a first busbar connecting electrodes disposed at the first ends of the plurality of cells and a second busbar connecting electrodes disposed at the second ends of the plurality of cells.

In an embodiment of the energy storage power supply according to the second aspect, the housing has a receiving groove defined at an outer wall of the housing corresponding to the first support, the first busbar being accommodated in the receiving groove and connecting the electrodes disposed at the first ends of the plurality of cells through the first through holes of the plurality of first fixing members.

In an embodiment of the energy storage power supply according to the second aspect, the energy storage power supply further includes a cover plate accommodated in the receiving groove and covering the receiving groove.

Referring to FIG. 1 to FIG. 4, an energy storage power supply 100 according to an implementation of the present disclosure includes a housing 10 and a plurality of cells 20.

The housing 10 has an accommodation cavity 11 defined therein. The accommodation cavity 11 is provided with a plurality of first fixing members 1111 at an inner wall 113 of the accommodation cavity 11. Each of the plurality of first fixing members 1111 has a first through hole 1112 defined at a bottom wall of the first fixing member 1111. The plurality of cells 20 corresponds to the plurality of first fixing members 1111 in one-to-one correspondence. Each of the plurality of cells 20 includes a body 21, a first pole 22, and a second pole 23. The first pole 22 and the second pole 23 are respectively disposed at two ends of the body 21 in a length direction of the body 21. One of the two ends of the body 21 is accommodated in a corresponding one of the plurality of first fixing members 1111. The first pole 22 is configured for an external connection by means of the first through hole 1112.

In the above energy storage power supply 100, the first fixing member 1111 is disposed at the inner wall 113 of the accommodation cavity 11, and one end of the body 21 of the cell 20 is accommodated in the first fixing member 1111, so that the cell 20 can be directly mounted at the first fixing member 1111 without the need to be assembled into a battery module first and then put into the housing 10, thereby reducing an assembly process and lowering the cost. In addition, parts required for assembling the cell 20 into the battery module can also be reduced. Further, a space utilization rate of the product can be improved, and a size of the product can be reduced.

In an implementation, at least part of the housing 10 of the energy storage power supply 100 encloses the accommodation cavity 11. The accommodation cavity is configured to accommodate the cell 20. The cell 20 may be in a cylinder shape. The cell 20 may be vertically placed in the accommodation cavity 11, and a vertical direction of the cell 20 corresponds to a length direction of the body 21 of the cell 20. Correspondingly, the first fixing member 1111 may be disposed at a bottom of the accommodation cavity 11, so that the first fixing member 1111 is fixed to a bottom end of the cell 20. It can be understood that the first fixing member 1111 may also be disposed at a top of the accommodation cavity 11, so that the first fixing member 1111 is fixed to a top end of the cell 20. The first fixing member 1111 and the housing 10 may be integrally formed or the first fixing member 1111 may be connected to a bottom of the inner wall 113 of the accommodation cavity 11 in other fixed connection manners, so that the cell 20 and the housing 10 are fixed. The first pole 22 and the second pole 23 of the cell 20 are current interfaces when the cell 20 is powered or charged. The cell 20 includes a first pole 22 and a second pole 23 respectively disposed at two ends of the body 21 in a length direction of the body 21, and the first pole 22 is configured for an external connection by means of the first through hole 1112, that is, the cell 20 includes two poles, and one of the two poles is configured for an external connection by means of the first through hole 1112.

When the two adjacent cells 20 have different electrical connections, the polarity of the first pole 22 and the polarity of the second pole 23 can also be different. When two adjacent cells 20 are connected in series, one of the two adjacent cells 20 has a first pole 22 that is a positive pole and a second pole 23 that is a negative pole, and the other of the two adjacent cells 20 has a first pole 22 that is a negative pole and a second pole 23 that is a positive pole. When two adjacent cells 20 are connected in in parallel, one of the two adjacent cells 20 has a first pole 22 that is a positive pole and a second pole 23 that is a negative pole, and the other of the two adjacent cells 20 has a first pole 22 that is a positive pole and a second pole 23 that is a negative pole. The first pole 22 may pass through the housing 10 through the first through hole 1112 on the first fixing member 1111 to be electrically connected to an external device when the first fixing member 1111 is located at the bottom of the accommodation cavity 11, the first pole 22 is a negative electrode, and the first pole 22 is connected to the first fixing member 1111. Therefore, an external energy supply or energy charging port of the energy storage power supply 100 is established. A number of the first fixing members 1111 is consistent with a number of the cells 20, so that all the cells 20 are respectively fixed in one first fixing member 1111. The first fixing member 1111 may be a circular groove and has a diameter corresponding to a diameter of the cell 20. The diameter of the first fixing member 1111 may be the same as the diameter of the cell 20, so that the cell 20 is fixed in the groove. The diameter of the first fixing member 1111 may also be slightly smaller than the diameter of the cell 20, thereby enhancing fixing strength of the cell 20 through an interference fit between them. It can be understood that the first fixing member 1111 may be in a shape of a triangle, a polygon, or other irregular shapes, and a diameter of the largest inscribed circle of the first fixing member 1111 is kept to meet the above conditions. A diameter of the first through hole 1112 is smaller than or equal to the diameter of the first fixing member 1111, thereby preventing the cell 20 from sliding off from the first through hole 1112. Therefore, by reducing a number of structural members, a size and weight of the energy storage power supply 100 can be reduced, thereby optimizing a product structure and an assembly process, improving a product volume energy density and a mass energy density, reducing costs, and being easy to carry. In some implementations, the first fixing member 1111 may be a fixing groove in an interference fit with the cell 20, or may be in a form such as a hoop or a clamping sheet to fix the cell 20.

In addition, in some other implementations, the cell 20 may also be a square cell. In a case where the cell 20 is the square cell, the first fixing member 1111 is also in a corresponding square shape. In some other implementations, the cell 20 may also be placed in the accommodation cavity 11 horizontally or in other directions. When the cell 20 is horizontally placed, the first fixing member 1111 may be disposed at a front inner wall, a rear inner wall, a left inner wall or a right inner wall of the accommodation cavity 11 to fix the cell 20.

Figure 5:
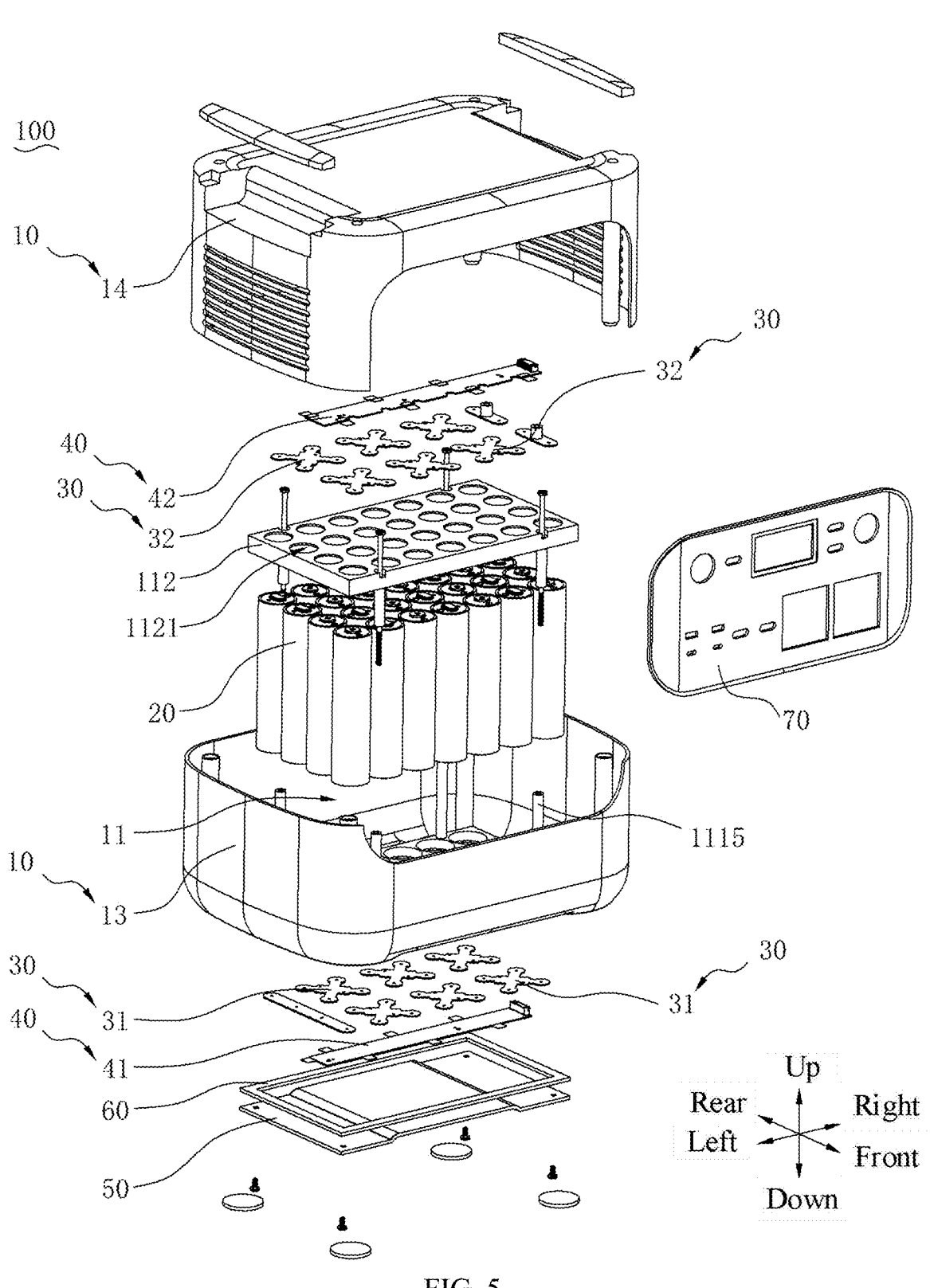
FIG. 5 is a schematic exploded view of an energy storage power supply according to an implementation of the present disclosure.

Referring to FIG. 5, in some implementations, a first support 111 is disposed at the inner wall of the accommodation cavity 11. The plurality of first fixing members 1111 is disposed at the first support 111.

In this way, a structure of the housing 10 may be simplified.

Specifically, referring to FIG. 5, in an implementation, the first support 111 may be disposed at the bottom of the accommodation cavity 11, and the plurality of first fixing members 1111 is disposed at the first support 111. The plurality of first fixing members 1111 is assembled on the first support 111, so that the structure of the housing 10 may be simplified. The first support 111 may be welded at the housing 10 or may be detachably fixed at the housing 10 through bolts or the like, to replace the first support 111 having different numbers of first fixing members 1111 as required, thereby increasing flexibility of the energy storage power supply 100.

In some implementations, the first support 111 and the housing 10 may be integrally formed.

In this way, the connection strength between the first support 111 and the housing 10 can be enhanced, and the manufacturing efficiency of the energy storage power supply 100 can be improved.

Specifically, in some implementations, the material of each of the first support 111 and the housing 10 is plastic, and the housing 10 and the first support 111 can be manufactured as a whole through injection molding process, so that the first support 111 and the housing 10 are integrally formed.

In an implementation, the material of the first support 111 and the housing 10 can be metal, and the first support 111 and the housing 10 can be manufactured as a whole through processes such as die casting and stamping, so that the first support 111 and the housing 10 are integrally formed.

Due to the integrated structure of the first support 111 and the housing 10, the gap between the first support 111 and the housing 10 can be eliminated, thereby improving the connection strength between the first support 111 and the housing 10. The first support 111 and the housing 10 are integrally formed, which can also improve the manufacturing efficiency of the energy storage power supply 100.

Referring to FIG. 5, in some implementations, the energy storage power supply 100 includes a second support 112 located in the accommodation cavity 11. The second support 112 is connected to the inner wall of the accommodation cavity 11. The second support 112 is provided with a plurality of second fixing members (not shown). Each of the plurality of second fixing members has a second through hole 1121 defined at a bottom wall of the second fixing member. The plurality of cells 20 corresponds to the plurality of second fixing members in one-to-one correspondence. Another one of the two ends of the body 21 is accommodated in a corresponding one of the plurality of second fixing members, and the second pole 23 is configured for an external connection by means of the second through hole 1121.

In this way, the fixing strength of the cell 20 is enhanced.

Specifically, the cell 20 has the second pole 23 configured for an external connection by means of the second through hole 1121 and the first pole 22 configured for an external connection by means of the first through hole 1112, that is, the cell 20 includes two poles, which are configured for an external connection by means of the first through hole 1112 and the second through hole 1121 respectively.

When the two adjacent cells 20 have different electrical connections, the polarity of the first pole 22 and the polarity of the second pole 23 can also be different. When two adjacent cells 20 are connected in series, one of the two adjacent cells 20 has a first pole 22 that is a positive pole and a second pole 23 that is a negative pole, and the other of the two adjacent cells 20 has a first pole 22 that is a negative pole and a second pole 23 that is a positive pole. When two adjacent cells 20 are connected in in parallel, one of the two adjacent cells 20 has a first pole 22 that is a positive pole and a second pole 23 that is a negative pole, and the other of the two adjacent cells 20 has a first pole 22 that is a positive pole and a second pole 23 that is a negative pole.

Referring to FIG. 5, in an implementation, in a case where the first fixing member 1111 is fixed to one end of the cell 20, and where the first pole 22 is configured for an external connection by means of the first through hole 1112 of the first fixing member 1111, the second support 112 may be fixed to another end of the cell 20. In a case where the first fixing member 1111 is disposed at the bottom of the accommodation cavity 11, the second support 112 may be fixedly connected to the top of the accommodation cavity 11, so that when the energy storage power supply 100 is subjected to external interference like vibration, the cell 20 is prevented from being bent or being thrown out. The second fixing member may be a circular groove and has a diameter corresponding to the diameter of the cell 20. The diameter of the second fixing member may be the same as the diameter of the cell 20, so that the cell 20 is fixed in the groove. The diameter of the second fixing member may also be slightly smaller than the diameter of the cell 20, thereby enhancing fixing strength of the cell 20 through an interference fit between them. It can be understood that the second fixing member may be in a shape of a triangle, a polygon, or other irregular shapes, and a diameter of the largest inscribed circle of the second fixing member is kept to meet the above conditions. A diameter of the second through hole 1121 is smaller than or equal to the diameter of the second fixing member, thereby preventing the cell 20 from sliding off from the second through hole 1121. When the diameter of the first through hole 1112 is smaller than the diameter of the first fixing member 1111 and the diameter of the second through hole 1121 is smaller than the diameter of the second fixing member, two ends of the cell 20 may simultaneously abut against the first fixing member 1111 of the first support 111 and the second fixing member of the second support 112, thereby further enhancing the fixing strength of the cell 20.

In some implementations, the second fixing member has a shape corresponding to a cross-sectional shape of the cell 20 or may be in a square shape. In addition, when the cell 20 is placed in the accommodation cavity 11 in a horizontal direction or other directions, the first support 111 and the second support 112 may also be disposed at the inner wall 113 of the accommodation cavity 11 in the corresponding direction, and have an effect of respectively fixing one end of the cell 20. It can be understood that, in other implementations, the cell 20 may be placed in the accommodation cavity 11 at various angles, and a position of a portion connected to the cell 20 may be adjusted correspondingly. Details are omitted below.

Figure 2:
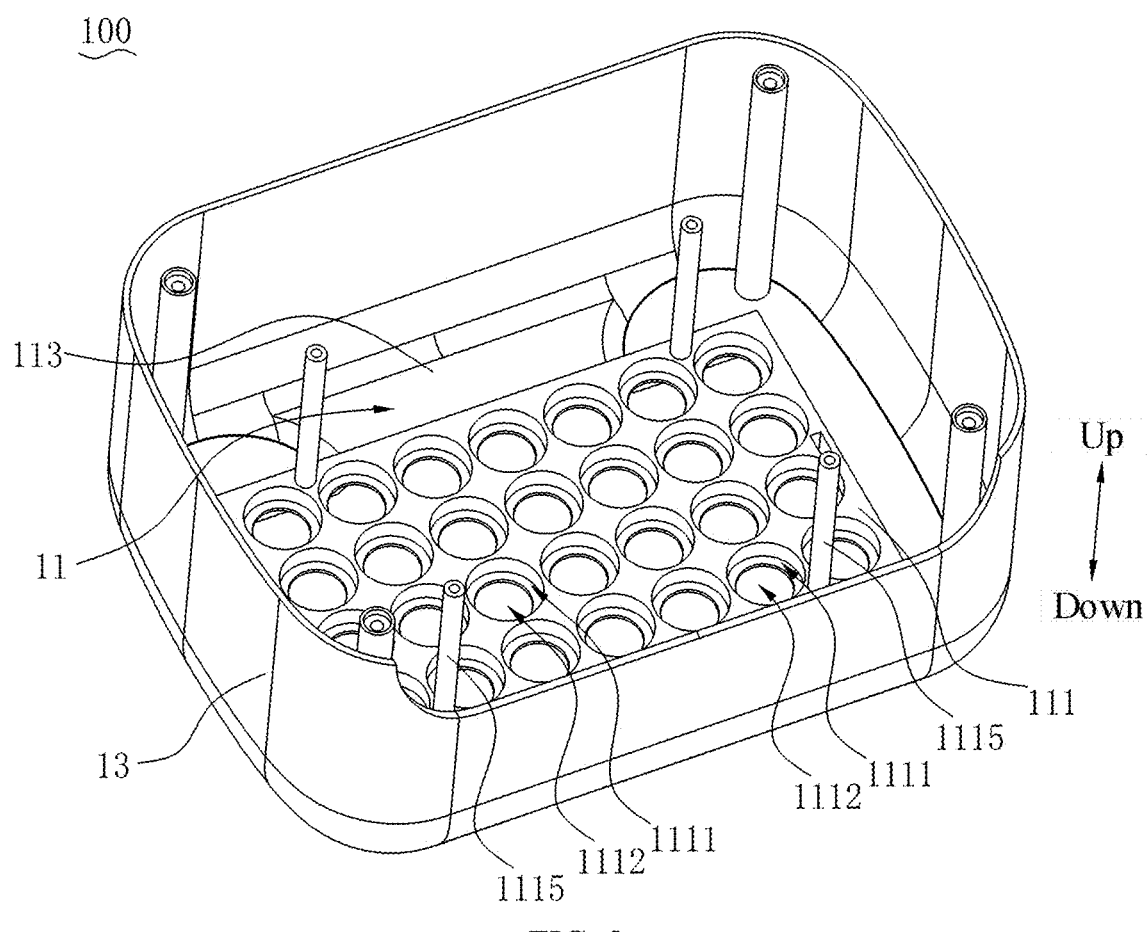
FIG. 2 is a schematic structural view of a first housing of an energy storage power supply according to an implementation of the present disclosure.
Figure 3:
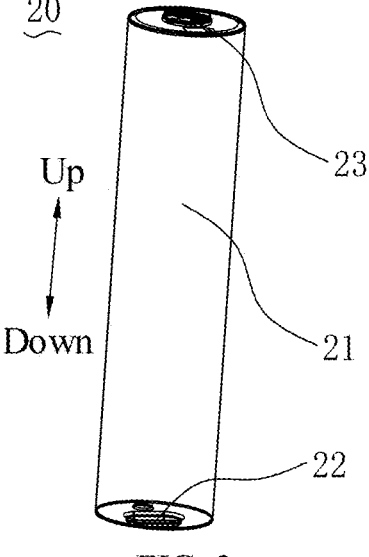
FIG. 3 is a schematic structural view of a cell according to an implementation of the present disclosure.
Figure 4:
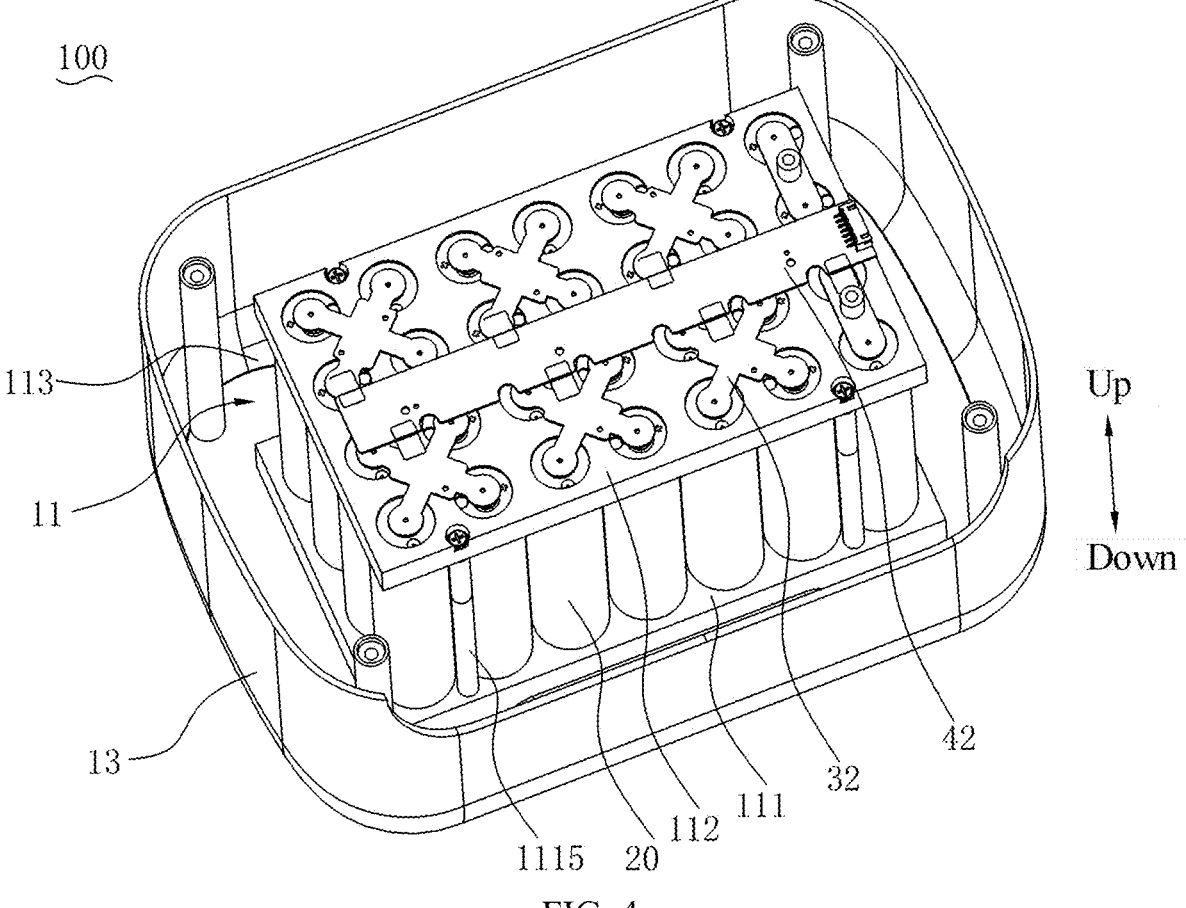
FIG. 4 is a schematic view of an internal structure of an energy storage power supply according to an implementation of the present disclosure.

Referring to FIG. 2, in some implementations, the first support 111 includes a plurality of support posts 1115 fixedly connected to the second support 112.

In this way, the fixing strength of the cell 20 is enhanced.

Specifically, referring to FIG. 2, in an implementation, the support post 1115 disposed on the first support 111 extends to the second support 112 in a height direction of the energy storage power supply 100 and is connected to the second support 112. The support post 1115 may have a threaded hole defined thereon. The second support 112 may include a threaded member for screwing into the threaded hole. In this way, the first support 111 is fixedly connected to the second support 112 through a threaded fit, to clamp and fix the cell 20 at the two ends of the cell 20. In addition, the first support 111 may further include a bottom plate, and the bottom plate is a structural body of the first support 111. The support post 1115 and the bottom plate may be integrally formed, or the support post 1115 may be fixedly connected to the bottom plate through a threaded connection or the like. In another implementation, the support post 1115 may also be fixedly connected to the second support 112 through a snap, a bolt, or the like.

Figure 6:
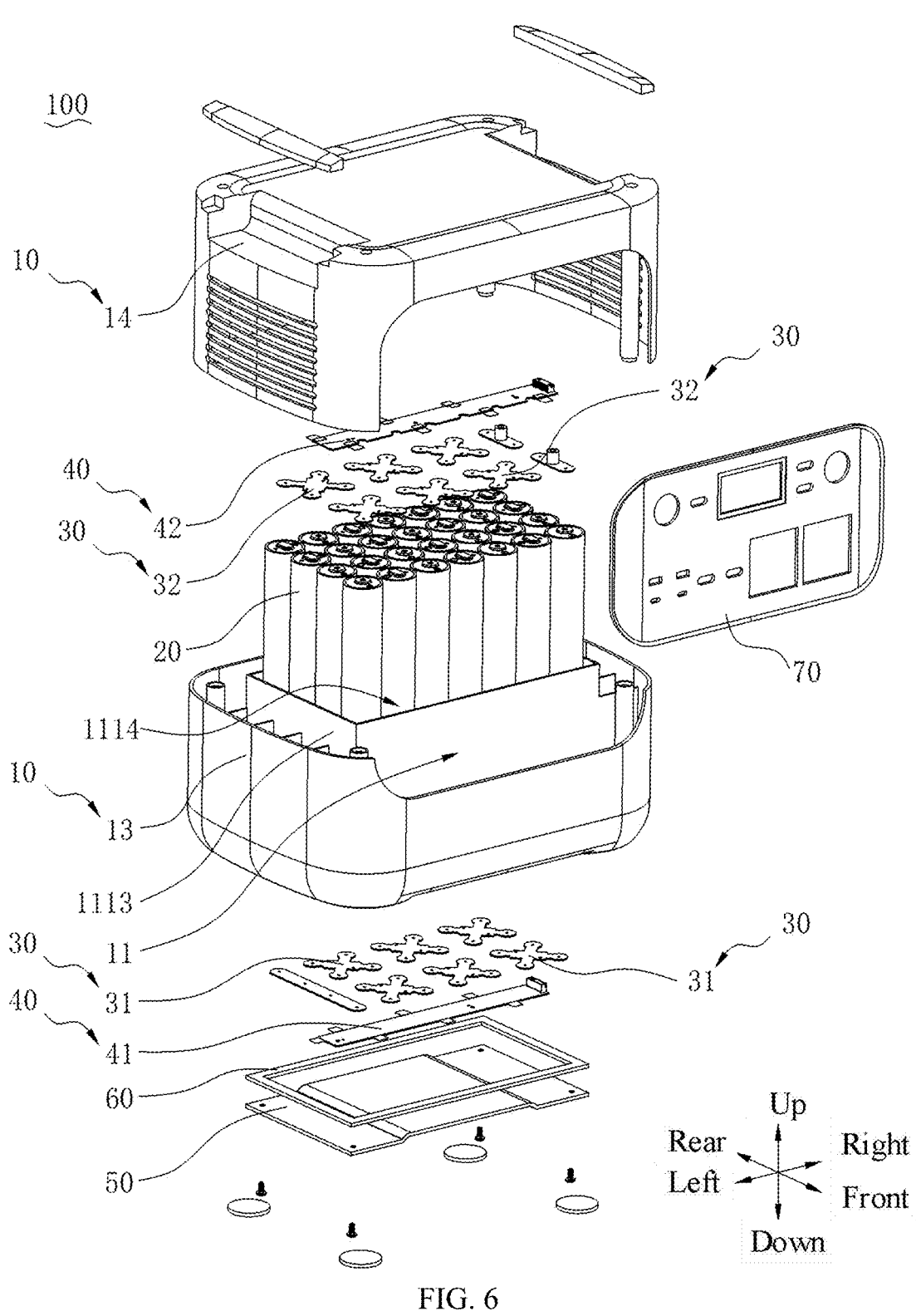
FIG. 6 is another schematic exploded view of an energy storage power supply according to an implementation of the present disclosure.
Figure 7:
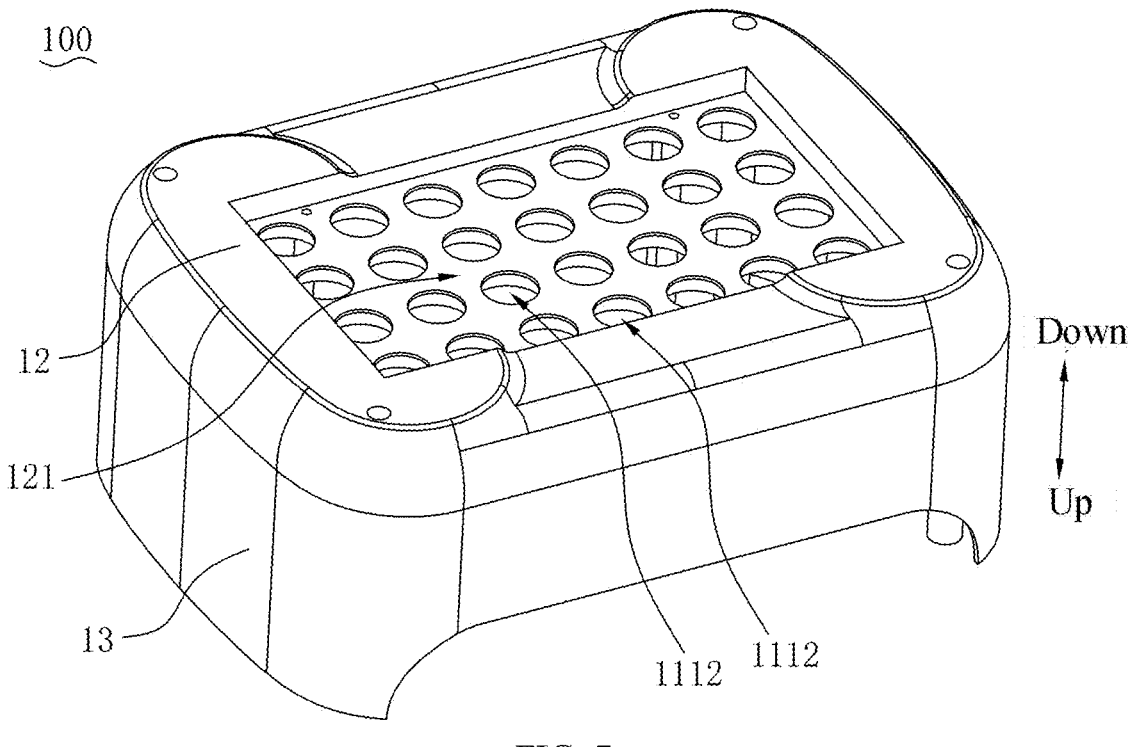
FIG. 7 is another schematic structural view of a first housing of an energy storage power supply according to an implementation of the present disclosure.
Figure 8:
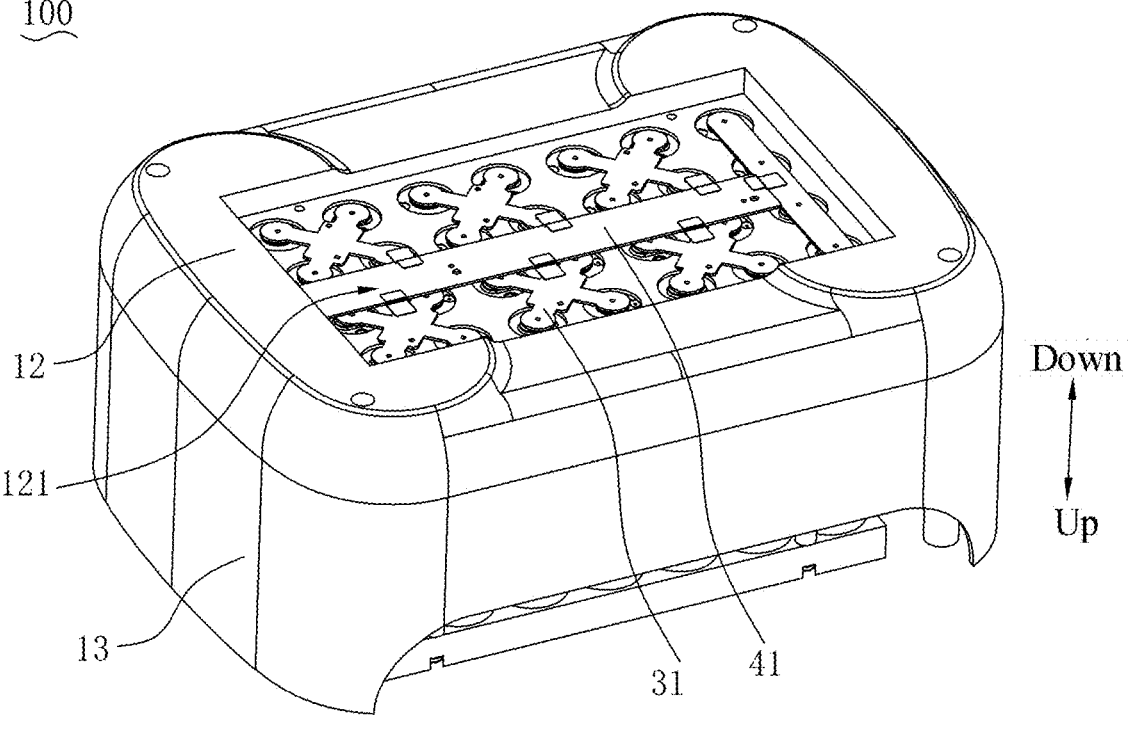
FIG. 8 is a partially schematic structural view of an energy storage power supply according to an implementation of the present disclosure.

Referring to FIG. 6, in some implementations, the first support 111 includes a surrounding wall 1113 connected to the inner wall 112 of the accommodation cavity 11. The surrounding wall 1113 encloses an accommodation groove 1114 in communication with the plurality of first fixing members 1111.

In this way, the fixing strength of the cell 20 is enhanced.

Specifically, referring to FIG. 6, in an implementation, in a length direction of the body 21 of the cell 20, the first support 111 may have the surrounding wall 1113 located around the cell 20. A height of the surrounding wall 1113 is smaller than a length of the cell 20. In the length direction of the body 21 of the cell 20, an opening is defined at each of an upper end and a lower end of the surrounding wall 1113. The first fixing member 1111 of the first support 111 closes the opening at one of the two ends of the surrounding wall 1113. The surrounding wall 1113 and the first fixing member 1111 of the first support 111 enclose the accommodation groove 1114 that is defined in the accommodation cavity 11.

Referring to FIG. 6, in some implementations, the accommodation groove 1114 is injected with a fixing colloid fixedly connected to the plurality of cells 20 and the first support 111.

In this way, safety of the cell 20 can be improved.

After the cell 20 is placed in the accommodation groove 1114, the cell 20 covers the first through hole 1112 of the first fixing member 1111, so that other side surfaces of the accommodation groove 1114 except for a top end of the accommodation groove 1114 are sealed. When a top opening of the accommodation groove 1114 is kept upwards, the accommodation groove 1114 is injected with the fixing colloid. After the fixing colloid is solidified, the first support 111 is connected to the cell 20 to be conveniently placed in the accommodation cavity 11 in an inclined or horizontal posture. The fixing colloid may have a predetermined viscosity capability, thereby reducing a plurality of degrees of freedom of the cell 20. It can be understood that the fixing colloid may have no viscous capability, thereby reducing two degrees of freedom of the cell 20. Through the cooperation of the fixing colloid and the first fixing member 1111, a fixing strength and shock absorption capability of the cell 20 can be further enhanced.

In addition, in some implementations, the fixing colloid may be a structural adhesive. The structural adhesive may withstand a great load. By injecting the structural adhesive into the accommodation groove 1114, an impact-resistance capability of the cell 20 can be enhanced. In a case where the housing 10 of the energy storage power supply 100 is damaged and directly impacts the cell 20, the structural adhesive may bear a part of impact force and may simultaneously transmit the impact force to the whole of cell 20 to reduce an impact damage. In addition, the structural adhesive has good corrosion resistance. When electrolyte leakage is caused by structural damages of part of cells 20 or an electrolyte of an explosion-proof valve (not shown) of the cell 20 is sprayed out because of thermal runaway, the structural adhesive can prevent further leakage of the electrolyte from corroding other cells 20 or other structural components.

Referring to FIG. 5 and FIG. 6, in some implementations, the energy storage power supply 100 includes a busbar assembly 30. The busbar assembly 30 includes a first busbar 31 and a second busbar 32. The first busbar 31 is connected to first poles 22 of at least two of the plurality of cells 20. The second busbar 32 is connected to second poles 23 of at least two of the plurality of cells 20.

In this way, it is beneficial to use of the cell 20 as a whole for supplying power to the electric device.

Specifically, referring to FIG. 5 and FIG. 6, in an implementation, the energy storage power supply 100 may increase diversity of an output current through the busbar assembly 30. The first pole 22 of the cell 20 is connected to the first busbar 31 through the first through hole 1112. The second pole 23 of the cell 20 may be directly connected to the busbar. The first busbar 31 may be connected to a part of the first pole 22 of the cell 20, and the second busbar 32 may be connected to a corresponding part of the second pole 23 of the cell 20, so that the part of the cell 20 outputs electric energy outwards or inputs electric energy inwards in the form of a parallel connection. The busbar assembly 30 may include a plurality of first busbars 31 and a plurality of second busbars 32. The plurality of first busbars 31 or the plurality of second busbars 32 may be connected in series or in parallel to output electric energy outwards or input electric energy inwards. The busbar assembly 30 may be made of copper, aluminum, nickel, or an alloy material. After the busbar assembly 30 is fixed to a correct position through an operation jig, the busbar assembly 30 is laser-welded to the first pole 22 or the second pole 23 of the cell 20. It can be understood that an electrical connection between the busbar assembly 30 and the pole of the cell 20 may also be implemented through other connection manners such as twisting or pressing. In another implementation, the energy storage power supply 100 further includes a second support 112, and the second pole 23 of the cell 20 may be connected to the second busbar 32 through the second through hole 1121.

In addition, in another implementation, the energy storage power supply 100 may further collect state information of each cell 20 through a collection assembly 40. The status information of the cell 20 may include information such as a voltage, a current, and a temperature of each cell 20. The collection assembly 40 may include a first collection plate 41 and a second collection plate 42. The first collection plate 41 is connected to the first busbar 31. The second collection plate 42 is connected to the second busbar 32. After each of the first busbar 31 and the second busbar 32 is welded, the first collection plate 41 may be fixed to a corresponding position on the first busbar 31 through screws, and the second collection plate 42 is fixed to a corresponding position on the second busbar 32. After the collection assembly 40 is fixed, a nickel strip of the first collection plate 41 can be connected to the first busbar 31 through an electrical connection like laser-welding, so that the electrical connection between the first collection plate 41 and the first busbar 31 is realized. Meanwhile, the second collection plate 42 and the second busbar 32 may also be connected to each other in the same manner.

Referring to FIG. 5 to FIG. 8, in some implementations, the energy storage power supply 100 includes a cover plate 50. The housing 10 has a receiving groove 121 defined at an outer side wall 12 of the housing 10 corresponding to the plurality of first fixing members 1111. The first through hole 1112 passes through a bottom wall of the receiving groove 121. The first busbar 31 is located in the receiving groove 121. The cover plate 50 is disposed at the outer side wall 12 of the housing 10 and covers the receiving groove 121.

In this way, it is beneficial to reduce the product volume.

Specifically, referring to FIG. 5 to FIG. 8, in an implementation, the first housing 13 and the second housing 14 may be connected to each other through bolts and enclose the accommodation cavity 11. When the cell 20 is vertically placed in the accommodation cavity 11, and when the first fixing member 1111 is disposed at the bottom of the accommodation cavity 11, the receiving groove 121 is also disposed at the bottom of the housing 10. The outer side wall 12 at the bottom of the housing 10 is recessed inwards to form the receiving groove 121, and the outer side wall 12 is a bottom wall of the housing 10. The first pole 22 of the cell 20 passes through the first fixing member 1111 through the first through hole 1112 and enters the receiving groove 121. The first busbar 31 may also be connected to the first pole 22 in the receiving groove 121. Therefore, the first pole 22 and the first busbar 31 can be integrated at the bottom of the housing 10, thereby improving an overall integration degree to reduce the product volume. By providing the cover plate 50 to cover the receiving groove 121, an integrity degree of the housing 10 can be further improved, and the first pole 22 and the first busbar 31 are protected. The cover plate 50 is fixed to the housing 10 through bolts or other manners in other exemplary implementations of the present disclosure, which is not limited herein.

In some implementations as shown in FIG. 5 to FIG. 8, the first support 111 and the first housing 13 may be integrally formed.

In some implementations, the cover plate 50 is connected to the housing 10 through an adhesive (not shown) within the receiving groove 121 and is fixed to the housing 10 through a fastener (also not shown).

In this way, the cover plate 50 can be fixed.

Specifically, the adhesive may be injected into the receiving groove 121, and then the cover plate 50 is covered, so that the cover plate 50 and the housing 10 are connected by the adhesive. In this way, the cover plate 50 can be fixed. Then, the cover plate 50 is fixed to the housing 10 through the fastener (such as a screw). The adhesive can play the role of pre-fixing the cover plate 50 on the housing 10, thereby ensuring the fixing effect between the cover plate 50 and the housing 10 through the fastener on to a certain extent.

Referring to FIG. 5 to FIG. 8, in some implementations, the energy storage power supply 100 includes a thermal conductive adhesive. The thermal conductive adhesive is connected to the cover plate 50 and the first busbar 31.

In this way, a temperature of the first busbar 31 can be lowered.

Specifically, referring to FIG. 5 to FIG. 8, in an implementation, a predetermined current loss is formed and heat is generated when a current flows through the first busbar 31. The accumulated heat causes potential safety hazards such as fire and the like caused by an increase in the temperature of the first busbar 31 and the temperature of the cell 20. Therefore, by filling the thermal conductive adhesive between the first busbar 31 and the cover plate 50, heat of the first busbar 31 can be transferred to the cover plate 50, so that the heat is dissipated into a surrounding environment through the cover plate 50 to achieve a cooling effect on the first busbar 31 and the cell 20. The cover plate 50 may be made of an aluminum material, thereby having a good heat transfer effect. Meanwhile, the housing 10 may also be made of a material with a good heat transfer effect such as an aluminum material, to further transfer the heat of the cover plate 50 to the housing 10, thereby improving the cooling effect on the first busbar 31 and the cell 20.

Referring to FIG. 5 and FIG. 6, in some implementations, the energy storage power supply 100 further includes a sealing ring 60 sealingly connected to the cover plate 50 and the outer side wall 12 of the housing 10.

In this way, a sealing effect of the receiving groove 121 can be improved.

Specifically, referring to FIG. 5 and FIG. 6, in an implementation, the housing 10 has a receiving groove 121 defined at the outer side wall 12 of the housing 10. The busbar assembly 30 is accommodated in the receiving groove 121. In a humid use environment, when the sealing effect of the receiving groove 121 is poor, an invasion of water vapor into the receiving groove 121 is caused, and the invaded water vapor causes the first busbar 31 to be rusted or even short-circuited. Therefore, in a case where the cover plate 50 covers the receiving groove 121, the sealing ring 60 may be disposed between the cover plate 50 and the outer side wall 12 of the housing 10 to enhance the sealing effect on the receiving groove 121, which further isolates the busbar assembly 30 in the receiving groove 121 from external water vapor.

Referring to FIG. 5 and FIG. 6, in some implementations, the housing 10 includes a first housing 13 and a second housing 14. The first housing 13 and the second housing 14 are detachably connected to each other and enclose the accommodation cavity 11, and the plurality of first fixing members 1111 is disposed on the first housing 13 or the second housing 14.

In this way, installation or repair is facilitated.

Specifically, referring to FIG. 5 and FIG. 6, in an implementation, the housing 10 may include a first housing 13 located at an upper part of the housing 10 and a second housing 14 located at a lower part of the housing 10. The first fixing member 1111 may be disposed at the first housing 13 or the second housing 14. In some implementations, the first housing 13 and the second housing 14 may also be respectively located at front and rear parts or left and right parts of the housing 10, or the first housing 13 and the second housing 14 are distributed at two opposite corners of the housing 10. The first fixing member 1111 is disposed at one of the first housing 13 and the second housing 14. In another implementation, the first housing 13 and the second housing 14 may be detachably connected to each other through threads, snaps, hoops, or the like. The first housing 13 and the second housing 14 enclose the accommodation cavity 11 and accommodate the cell 20. Therefore, convenience of assembly or disassembly and maintenance can be improved. In another implementation, the energy storage power supply 100 further includes a second support 112. The first fixing member 1111 and the second support 112 may be connected to one of the first housing 13 and the second housing 14, respectively.

Referring to FIG. 5 and FIG. 6, in some implementations, the first fixing member 1111 and the first housing 13 are connected into an integrated structure, or the first fixing member 1111 and the second housing 14 are connected into an integrated structure.

In this way, an overall strength is improved.

Specifically, referring to FIG. 5 and FIG. 6, in an implementation, the first fixing member 1111 and the first housing 13 may be of an integrated structure, thereby improving integrity of the first fixing member 1111 and the housing 10. During transportation of the energy storage power supply 100, the housing 10 and the first fixing member 1111 that have better integrity can reduce shaking of the cell 20 relative to the housing 10, to reduce impact and extrusion between internal structures such as the cell 20, thereby ensuring use safety of the energy storage power supply 100. Certainly, the first fixing member 1111 may also be connected to the second housing 14 as an integrated structure. In another implementation, the energy storage power supply 100 further includes a second support 112. The first fixing member 1111 and the second support 112 may be respectively connected to the one of the first housing 13 and the second housing 14 as an integral structure.

In another implementation, the first fixing member 1111 and the first housing 13 may be integrally manufactured through an injection molding process, or the first fixing member 1111 and the second housing 14 may be integrally manufactured through an injection molding process.

In addition, referring to FIG. 1, in some implementations, the energy storage power supply 100 may further include a panel 70 disposed at the housing 10. The panel 70 may display information such as an electric quantity and a battery temperature of the current energy storage power supply 100. The panel 70 may further include a port of an energy storage power supply 100 connected to an electrical device or a charging device, so that the cell 20 may supply power to the electrical device or be charged by the charging device.

Although implementations of the present disclosure have been illustrated and described, it is conceivable for those of ordinary skilled in the art that various changes, combinations, modifications, replacements, and variations can be made to these implementations without departing from the principles and spirit of the present disclosure. The scope of the present disclosure shall be defined by the claims as appended and their equivalents.

What is claimed is:

1. An energy storage power supply, comprising:
a housing having an accommodation cavity defined therein, the accommodation cavity being provided with a first support at an inner wall of the accommodation cavity, and the first support being provided with a plurality of first fixing members, wherein the housing has a receiving groove defined at an outer wall of the housing corresponding to the first support;
a plurality of cells corresponding to the plurality of first fixing members in one-to-one correspondence, each of the plurality of cells is a cylinder cell, first ends of the plurality of cells being accommodated in the plurality of first fixing members, respectively, wherein each of the plurality of first fixing members is a first circular groove having a first through hole defined in a bottom wall of the first circular groove, the first through hole exposing an electrode disposed at the first end of a corresponding cell;
a second support disposed in the accommodating cavity, the second support being provided with a plurality of second fixing members corresponding to the plurality of cells in one-to-one correspondence, and second ends of the plurality of cells being accommodated in the plurality of second fixing members, respectively, wherein each of the plurality of second fixing members is a second circular groove having a second through hole defined at a bottom wall of the second circular groove, the second through hole exposing an electrode disposed at the second end of a corresponding cell;
a busbar assembly configured to electrically connect the plurality of cells, wherein the busbar assembly comprises a first busbar and a second busbar connecting electrodes disposed at the second ends of the plurality of cells, the first busbar being accommodated in the receiving groove and connecting the electrodes disposed at the first ends of the plurality of cells through the first through holes of the plurality of first fixing members; and
a port provided on the housing and configured to connect the energy storage power supply to an electrical device or a charging device.

2. The energy storage power supply according to claim 1, wherein the first support and the housing are integrally formed.

3. The energy storage power supply according to claim 1, wherein the first support and the housing are made of plastic.

4. The energy storage power supply according to claim 1, wherein the housing comprises a first housing and a second housing, the first housing and the second housing being detachably connected to each other and enclosing the accommodation cavity, and the first support being disposed on the first housing or the second housing.

5. The energy storage power supply according to claim 1, further comprising a panel disposed on the housing and configured to display an electric quantity of the energy storage power supply.

6. The energy storage power supply according to claim 5, wherein the port is disposed on the panel.

7. The energy storage power supply according to claim 1, wherein the first support comprises a plurality of support posts extending to the second support in a height direction of the energy storage power supply and fixedly connected to the second support.

8. The energy storage power supply according to claim 7, wherein each of the plurality of support posts has a threaded hole, the second support comprising a threaded member screwed into the threaded hole.

9. The energy storage power supply according to claim 7, wherein the plurality of support posts and the first support are integrally formed.

10. The energy storage power supply according to claim 1, wherein a diameter of the first through hole is smaller than or equal to a diameter of the first fixing member.

11. The energy storage power supply according to claim 1, further comprising a cover plate accommodated in the receiving groove and covering the receiving groove.

12. The energy storage power supply according to claim 1, wherein the first support comprises a surrounding wall connected to the inner wall of the accommodation cavity, the surrounding wall enclosing an accommodation groove in communication with the plurality of first fixing members.

13. An energy storage power supply, comprising:
a housing having an accommodation cavity defined therein, the accommodation cavity being provided with a first support at an inner wall of the accommodation cavity, and the first support being provided with a plurality of first fixing members, wherein the housing has a receiving groove defined at an outer wall of the housing corresponding to the first support;
a plurality of cells corresponding to the plurality of first fixing members in one-to-one correspondence, each of the plurality of cells is a cylinder cell, first ends of the plurality of cells being accommodated in the plurality of first fixing members, respectively, wherein each of the plurality of first fixing members is a first circular groove having a first through hole defined in a bottom wall of the first circular groove, the first through hole exposing an electrode disposed at the first end of a corresponding cell;
a second support disposed in the accommodating cavity, the second support being provided with a plurality of second fixing members corresponding to the plurality of cells in one-to-one correspondence, and second ends of the plurality of cells being accommodated in the plurality of second fixing members, respectively, wherein each of the plurality of second fixing members is a second circular groove having a second through hole defined at a bottom wall of the second circular groove, the second through hole exposing an electrode disposed at the second end of a corresponding cell, and wherein the first support comprises a plurality of support posts fixedly connected to the second support;
a busbar assembly configured to electrically connect the plurality of cells, wherein the busbar assembly comprises a first busbar and a second busbar connecting electrodes disposed at the second ends of the plurality of cells, the first busbar being accommodated in the receiving groove and connecting the electrodes disposed at the first ends of the plurality of cells through the first through holes of the plurality of first fixing members;

a cover plate accommodated in the receiving groove and covering the receiving groove and the first busbar; and a panel disposed on the housing and configured to display an electric quantity of the energy storage power supply.

14. The energy storage power supply according to claim 13, further comprising a port disposed on the panel and configured to connect the energy storage power supply to an electrical device or a charging device.

15. The energy storage power supply according to claim 13, wherein each of the plurality of support posts has a threaded hole, the second support including a threaded member screwed into the threaded hole.

16. The energy storage power supply according to claim 13, wherein the plurality of support posts and the first support are integrally formed.

17. The energy storage power supply according to claim 13, wherein a diameter of the first through hole is smaller than or equal to a diameter of the first fixing member.

18. The energy storage power supply according to claim 13, wherein the housing comprises a first housing and a second housing, the first housing and the second housing being detachably connected to each other and enclosing the accommodation cavity, and the first support being disposed on the first housing or the second housing.

19. The energy storage power supply according to claim 13, wherein the first support comprises a surrounding wall connected to the inner wall of the accommodation cavity, the surrounding wall enclosing an accommodation groove in communication with the plurality of first fixing members.

* * * * *